United States Patent [19]
Valkosky

[11] 3,839,789
[45] Oct. 8, 1974

[54] EASY ROLLING CIRCULAR SAW

[76] Inventor: John E. Valkosky, Box 3, Juneau, Pa. 15751

[22] Filed: Dec. 26, 1973

[21] Appl. No.: 427,469

Related U.S. Application Data

[63] Continuation-in-part of Ser. No. 313,176, Dec. 7, 1972, abandoned.

[52] U.S. Cl. .................................. 30/374, 30/273
[51] Int. Cl. ............................................. B27b 9/04
[58] Field of Search ............ 30/273, 292, 294, 373, 30/374, 375, 376, 377, 379

[56] References Cited
UNITED STATES PATENTS
841,325   1/1907   King ..................................... 30/273

1,808,228   6/1931   Hulack et al. ..................... 30/376

FOREIGN PATENTS OR APPLICATIONS
801,927   1/1951   Germany ............................ 30/273

*Primary Examiner*—Al Lawrence Smith
*Assistant Examiner*—Marc R. Davidson
*Attorney, Agent, or Firm*—Sherman H. Barber

[57]   ABSTRACT

An electric circular hand saw is fitted with a wrap around or platform type of base to which are mounted in front and in rear positions transverse rollers extending entirely across the base or platform, with another such transverse roller mounted near the mid-length position of the base, but not extending fully across the base or platform.

3 Claims, 4 Drawing Figures

PATENTED OCT 8 1974 3,839,789

EASY ROLLING CIRCULAR SAW

CROSS REFERENCE TO RELATED APPLICATION

This application is a continuation-in-part of my co-pending application, Ser. No. 313,176 filed Dec. 7, 1972, now abandoned.

BACKGROUND OF THE INVENTION

Conventional heavy duty circular hand saws are sometimes provided with a wrap around base or platform that has an opening through which a circular saw blade extends; the saw blade being mounted to the shaft of an electric motor adjustably mounted to the base.

When using such a circular saw, and especially when one is making dado cuts, there is a tendency for the saw to cut too deeply at the end of the cut or dado. This is caused by a natural dropping of the saw due to gravity since there is no support for the front portion of the base after it has passed beyond the end of the work piece.

The present invention, however, is an improvement in hand held circular saws that obviates such difficulties. One who uses a hand held circular saw in accordance with my invention has no difficulty in making proper dado and other cuts in a workpiece. How the equipment of my invention accomplishes this will be clear to those skilled in the art from the following description of an embodiment of my invention.

SUMMARY OF THE INVENTION

To the base of a circular hand saw are journaled front and rear rollers extending substantially across the base. Near the mid-length location on the base there is a third roller, but it does not extend transversely across the base. The third roller is disposed slightly nearer the rear roller than is the axis of rotation of the saw blade.

For a further understanding of the invention reference may be made to the following description and drawings which show one embodiment of my invention.

DETAILED DESCRIPTION

This invention relates to hand tools, and more particularly, to an easy rolling circular saw.

Figure 1:
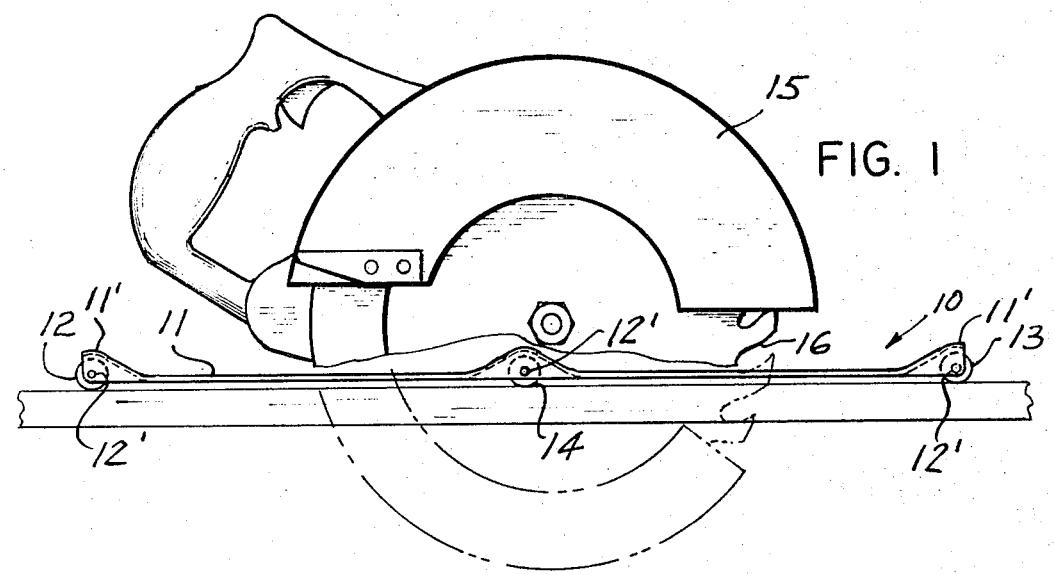
FIG. 1 is a side view of the present invention showing a saw in place with a portion of the blade in phantom lines.
Figure 2:
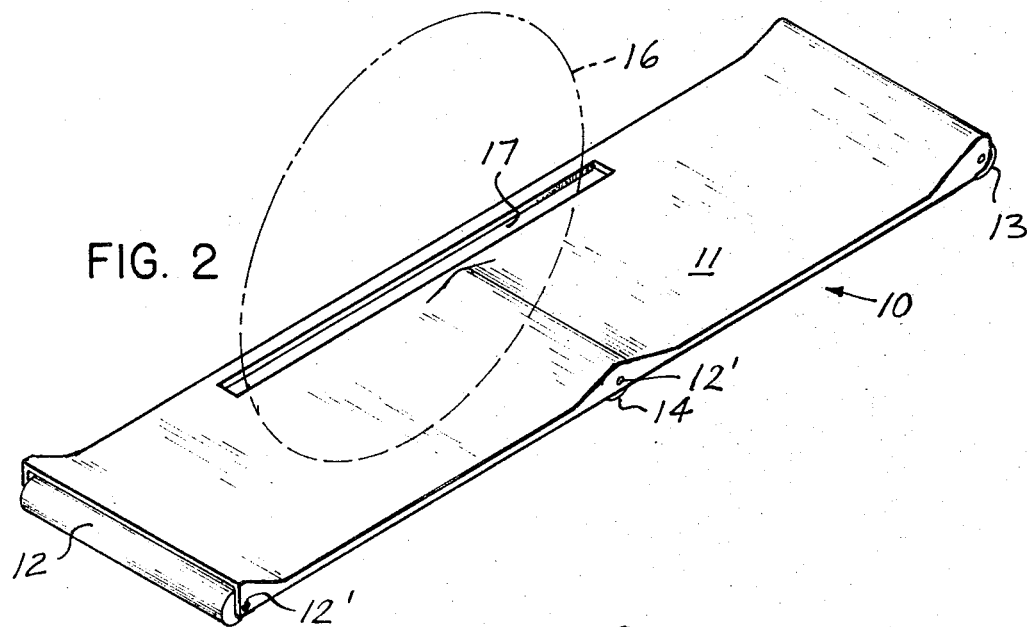
FIG. 2 is a perspective view of the base portion of the present invention showing the saw removed therefrom, but with an illustration of the blade shown in phantom lines.
Figure 3:
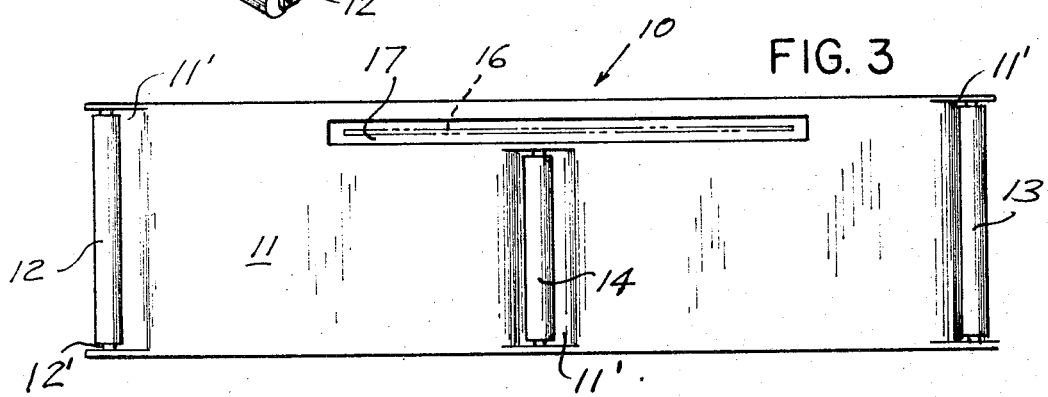
FIG. 3 is a bottom plan view of FIG. 2.
Figure 4:
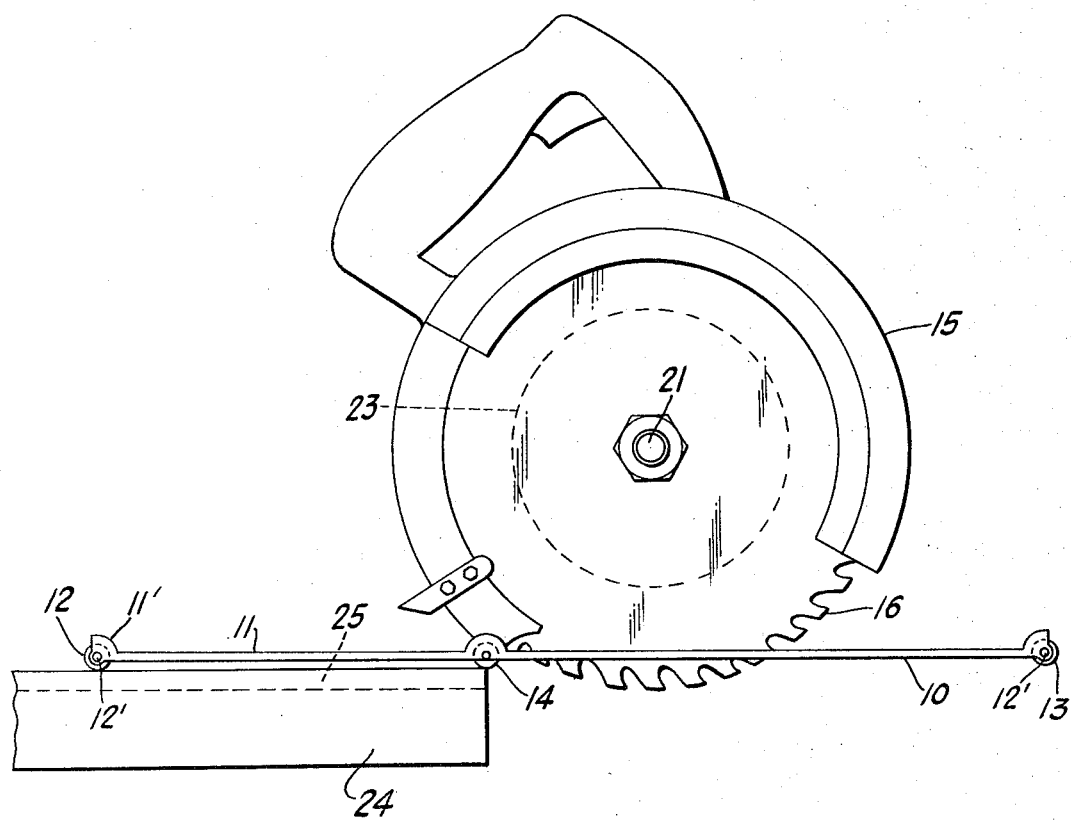
FIG. 4 is a view similar to that of FIG. 1, but showing the opposite side thereof.

According to the invention, a hand held circular saw 15, having a wrap around base or platform 10, is shown in FIGS. 1 and 4 and it includes a rectangular configuration 11 having hooded portions 11' in which are mounted rollers 12, 13 and 14 which are supported upon shafts 12'.

FIGS. 1 and 4 show the position of roller 14 relative to the axis of rotation 21 of the saw blade 16; the roller 14 being disposed somewhat toward the rear of the base or platform 11 and behind the axis of rotation 21.

Motor 23 which carries the saw blade 16 on its shaft is adjustable angularly with respect to a pivot (not shown) on the wrap around base or platform 11 so as to be able to make a kerf 25 of any desired depth, such as dado cuts for example. In the drawings and in accordance with the invention the axis of rotation 21 is in front of the axis of rotation of the roller 14. Thus, in use, the hand held circular saw 15 is placed so that the blade 16 is in line to commence a cut in a work piece 24, such as a wooden board or the like, the roller 13 first engages the work piece 24 and the saw blade 16 readily starts to make the cut. When the saw blade 16 gets to the end of the cut at the opposite end of the work piece, the saw base 11 is still supported at two points by roller 14 and by roller 12. Thus, the saw blade 16 does not drop down under the influence of gravity until after the blade has passed well beyond the opposite edge of the work piece.

From the foregoing description of one embodiment of my invention, those skilled in the art will recognize many features and advantages of which the following are significant:

That a hand held circular saw in accordance with my invention, having rollers extending across the wrap around base or platform, can make a more accurate cut than conventional hand held circular saws because the weight of the saw is more properly distributed in the saw of my invention; and That the saw of my invention can be moved and guided by a workman using it than can a conventional hand held circular saw of conventional construction due to the great reduction in the friction experienced by my saw with its rollers.

Although the invention has been described herein with a certain degree of particularity, it is understood that the disclosure has been made only as an example and that the scope of my invention is defined by what is hereinafter claimed.

What is claimed is:

1. In a hand held circular saw having a saw blade mounted to a shaft of a motor mounted to a wrap around base or platform having a blade opening therein, the improvement in said base or platform comprising:
   a. a plurality of rollers journaled to said base, each extending thereacross, said rollers being disposed at locations in front of and behind said shaft and blade opening and adapted to coact with a work piece when it is being cut by said saw blade; and
   b. another roller journaled to said base or platform and extending partially across said base or platform in close proximity to said blade opening, said other roller being disposed nearer to said rear roller than is said shaft and adapted to coact with said work piece when it is being cut.

2. The invention of claim 1 wherein:
   a. said rollers are arranged parallel to each other and parallel to said shaft.

3. In a hand held circular saw having a saw blade mounted to a shaft of a motor mounted to a wrap around base or platform having a blade opening therein, the improvement in said base or platform comprising:
a. front and rear elongate parallel rollers journaled to and extending across said base and arranged parallel to said shaft, said blade opening being disposed between said rollers; and b. another parallel roller journaled to said base and extending partially across said base toward said blade opening and disposed nearer said rear roller than is said shaft.

* * * * *